Sept. 5, 1944.  W. H. MANNING ET AL  2,357,482
OIL CLEANER
Filed Aug. 29, 1940
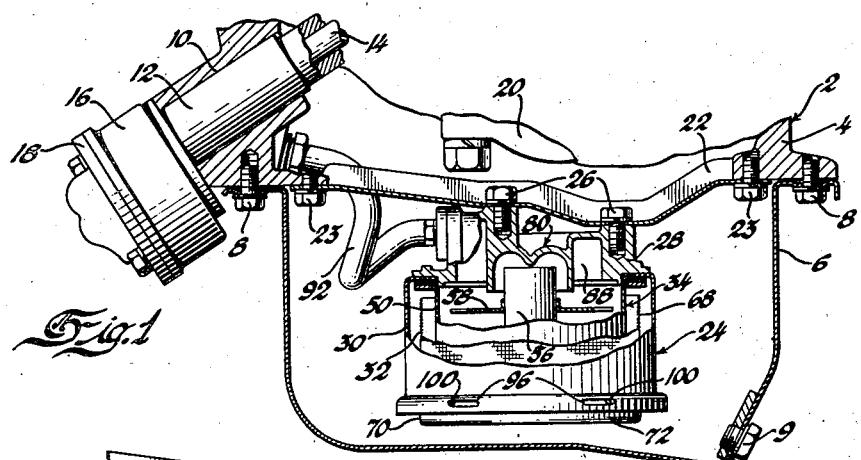
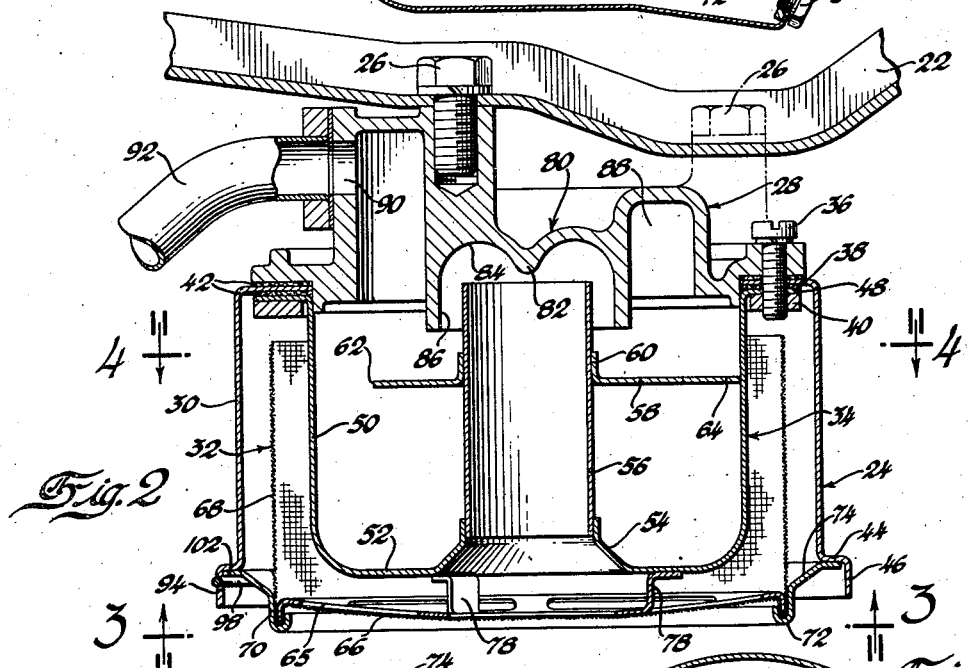
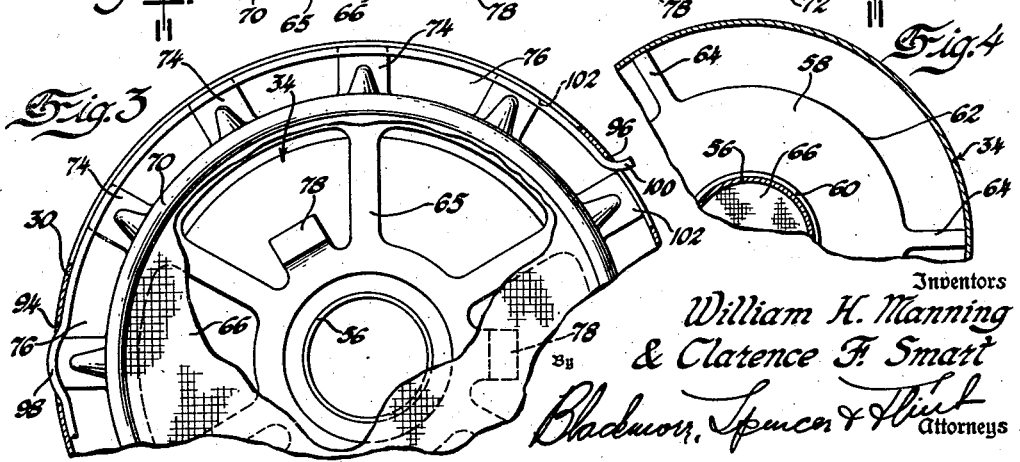
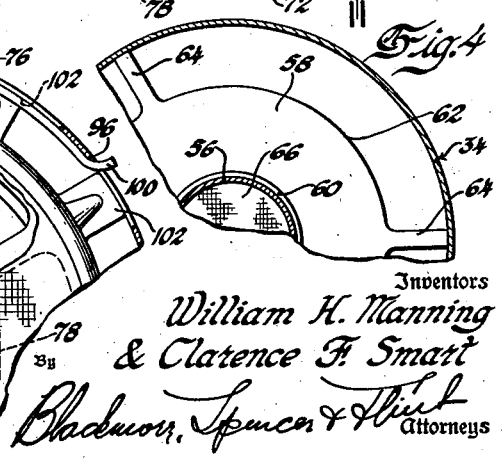
Inventors
William H. Manning
& Clarence F. Smart
Blackmore, Spencer & Flint
Attorneys Patented Sept. 5, 1944

2,357,482

UNITED STATES PATENT OFFICE 2,357,482

OIL CLEANER

William H. Manning, Birmingham, and Clarence F. Smart, Pontiac, Mich., assignors to General Motors Corporation, Detroit, Mich., a corporation of Delaware Application August 29, 1940, Serial No. 354,654

8 Claims. (Cl. 210—170)

This invention relates to oil cleaners and has particular reference to an oil cleaner adapted for installation on the suction side of the oil pump used in connection with the internal combustion engine of an automotive vehicle.

In the prior art, the filtering apparatus commonly used has permitted but a fraction of the oil handled by the pump to pass through the filter. An oil filter which causes all of the oil to pass through the filter before it passes to the bearings is to be preferred, but in practice it has been found that it would require too large a filter to enable all of the oil to be filtered. Where a screen filter is used, a screen of mesh fine enough to be efficient would plug quickly and shut off the entire oil supply. The desideratum has been to build in, as a part of the engine lubricating system, some kind of an apparatus which would pass all of the oil therethrough before it is delivered to the engine bearings, and remove from the oil the deleterious contaminating matter such as small iron particles, grit, abrasives, etc. In our investigation of the purification of oil, we found that it was desirable to have a cleaner which had the following characteristics:

1. It should be located on the suction side of the oil pump so that all oil passes through the apparatus before entering the bearings.

2. Particles harmful to the bearings must be very efficiently and quickly removed—from double to triple the effectiveness of oil filters now in use.

3. The apparatus must maintain its efficiency for the life of the engine.

4. At any operating engine temperature and with any of the usual grades of oil recommended for automobile engines, the apparatus must perform effectively.

5. The apparatus must not need cleaning and there should be no auxiliary apparatus or fitment to buy.

6. It must be built-in so that there is no possibility of the oil tubes leaking or being damaged, resulting in loss of oil.

With a view to obtaining the six characteristics mentioned in the foregoing, we made experiments with a type of oil cleaner which separated particles from the oil by means of the combined kinetic energy of the contaminating particles plus the force of gravity acting on them. This action will cause the particles to be precipitated and remove them from the system.

The cleaner which we have invented is placed on the suction side of the pump which draws all of the oil through the apparatus. A screen is for use when oil is cold and consequently quite viscous, but it is useless when oil is hot because the cleaner will take out particles of a fineness which will go right through the screen and will consequently remove those particles which the screen would catch. The oil first passes a screen which removes from the oil any large or heavy particles. The oil then passes up a riser and is caused to impact or rush against an oil flow reversing element. This element has a rounded or bowl-shaped surface with a rounded cone at the middle thereof, and the reverser causes the oil not only to change in direction of flow, but to flow over the outside of the riser. The riser is mounted in a cup which acts as a sediment trap and immediately below the top of the riser a baffle plate is mounted and against this baffle the oil strikes as it comes from the oil reversing member. The oil, as it strikes the baffle, enters a greatly enlarged passage so that the speed of the flow of the oil is considerably decreased and at the place where the oil strikes the baffle the contaminating particles in the oil are separated and leave the oil, pass outwardly along the baffle surface and drop to the sediment chamber below the baffle. The oil in the sediment chamber below the baffle remains substantially in an undisturbed condition so that any sediment once reaching the sediment trap is permanently removed from the system.

From the baffle the oil passes upwardly because the baffle again changes the direction of flow. In its upward direction it passes into a chamber or annular channel in a closure or cover for the sediment trap and from this chamber the oil passes through a pipe to the pump and is then delivered to the bearings.

On the drawing

Figure 1 is a transverse sectional view through the lower part of an internal combustion engine and the oil pan thereof, showing the installation of the oil cleaner, parts of the cleaner being broken away better to illustrate the construction.

Figure 2 is a view similar to Figure 1 on a larger scale showing a section through the oil cleaner.

Figures 3 and 4 are partial sectional views on the lines 3—3 and 4—4 of Figure 2.

Referring to the drawing, the numeral 2 indicates an internal combustion engine as a whole. The engine has the crankcase 4 and the oil pan 6 secured to the crankcase by means of the machine bolts 8. The oil pan 6 has the usual drain opening closed by a plug 9. The crankcase has a bearing opening 10 in which there is mounted the bearing sleeve 12 of the shaft 14 which drives an oil pump 16 of the usual type. The shaft 14 receives its power either from the crankshaft or camshaft (not shown) of the engine. The pump 16 has the removable cover 18 to enable the inspection of the pump. One of the stationary bearing caps of the crankshaft is indicated at 20.

At the underside of the crankcase, a transverse arm or brace 22 is secured by means of the machine bolts 23, and to this transverse brace the oil cleaner 24 of the invention is secured by means of a plurality of machine bolts 26.

Referring to Figure 2, the oil cleaner 24 comprises in general the cover or closure 28, the outer shield 30, the screen assembly 32, spaced from the shield 30, and the cup assembly 34 inside and spaced from the screen assembly 32. The shield 30 forms the outer protecting member of the oil cleaner and is secured to the cover 28 by means of a plurality of machine bolts 36 passing through the end flange of the cover 28 and through suitable openings in a flange 38 formed at the top of the shield. A ring 40 provided with threaded openings and positioned below the flange 38 holds the parts in place and suitable gaskets 42 are used to form a fluid tight connection. The lower part of the shield 30 is outwardly bent as at 44 and downwardly flanged as at 46 to form an annular shoulder.

The cup assembly 34 has the upper flange 48 which is positioned under the flange 38 of the cup and is held in place by means of the same machine bolts 36 and ring 40 which hold the flange 38. The cup itself is indicated at 50 and the bottom thereof, or the sediment trap, at 52. The bottom has an inwardly turned column or inlet 54 and to the column a tubular riser 56 is rigidly secured. The riser 56 or flow directing member has secured thereto below its top a baffle 58 having a flange 60 which fits tightly against the upper part of the riser and is rigidly secured thereto. The baffle 58 terminates short of the inner edge of the cup 50 as indicated at 62, and is also provided with three narrow legs 64 which extend out to the inner edge of the cup and are rigidly secured thereto.

The screen assembly 32 comprises the lower substantially flat screen element 66, the spider-like support therefor 65, the upstanding cylindrical screen 68, and the outer supporting and retaining ring 70. These parts are flanged and secured together as best shown at 72, and the ring 70 is provided with a plurality of extensions or feet 74 which fit under and against the shoulder formed by parts 44 and 46. Between the feet 74 the space indicated at 76 is open to enable the oil to pass therethrough to the cylindrical screen 68. The spider 65 has formed thereon adjacent its center three Z-shaped feet 78 which project upwardly and fit against the bottom 52 of the cup 50 and act as spacers.

The cap or closure 28 has formed therein at the center thereof the flow reversing construction or member 80 which has the conical projection 82 at the middle thereof. This projection 82 is rounded and smooth and extends downwardly and in line with the center line of the tubular riser 56. The flow reversing surface 84 of the reversing element 80 is rounded and smooth and of inverted bowl shape and in cross section appears arcuate as is shown in Figure 2. Below the top of the riser 56 the sides of the reverser 80 are straight to form a tubular neck as indicated at 86 and this neck extends downwardly a substantial distance beyond the top of the riser 56. In practice it has been found desirable to make the cross-sectional area of the inside of the riser 56 substantially the same as the cross-sectional area between the outer part of the riser and the inside of the neck 86 so that no change in the speed of flow of oil will take place when the oil strikes the flow reverser 80, but a smooth and even or constant change in the direction of flow of the oil will take place.

The closure or cap is also provided with the annular chamber 88 to receive the oil after it leaves the neck 86 and strikes the baffle 58. From the passage 88 the oil will flow to the outlet opening 90, into the outlet pipe 92, and then to the pump 16.

Referring to Figures 2 and 3, there is shown the manner in which the screen assembly 32 is secured to the shield or shroud 30. The flange 46 is provided with a plurality of openings 94 and 96 in which there are received the bent intermediate part 98 and the ends 100 of a spring wire. The body of the wire rests against the edges 102 of the feet 74 removably to hold the screen assembly inside the shield and between the shield and cup 50 as is shown in Figure 2. To remove the screen assembly the ends 100 are pulled toward each other to remove them from the openings 96. The wire may then be removed from the underside of the cleaner.

In the operation of the device the pump 16 will draw the oil from the oil pan 6 through the bottom screen 66 and also up through the openings 76 to the screen 68. The oil will pass through the screens and flow to the underside of the cup 50, and enter the column 54 and flow up the riser 56. At the top of the riser 56 the oil will strike the smooth surface of the flow reversing element 80 and the contact with this smooth rounded surface will change the direction of flow of the oil, that is, the flow direction will be reversed but the speed of the oil remains substantially the same as it was when it came up the riser, due to the fact that the area between the neck 86 and the top of the riser is substantially the same as the internal area of the riser. When the oil leaves the bottom of the neck 86 it will strike against the baffle 58 but as will be seen from Figure 2, the area of the passage or conduit through which the oil flows is now very much increased (about five times) so that the velocity of the flow of oil will be very much reduced. It is at this point, where the oil strikes the baffle 58, that the contaminating particles such as pieces of metal, grit, abrasives, etc., are thrown out, apparently due to the kinetic energy of the particles and due to the pull of gravity. These particles will move to the edge 62 of the baffle and then slowly work their way to the bottom 52 of the sediment trap. When the oil strikes the baffle 58 the flow is again reversed and the cleaned oil will now flow or be drawn upward into the chamber 88 in the closure 28. From the chamber 88 the oil will be drawn through the pipe 92 to the pump 16 and passed to the bearings. The cross-sectional area of the pipe 92 is considerably less than the cross-sectional area of the riser. The velocity through the pipe 92 is about five times that through the riser 56.

From the description as given, it is to be seen that the conduit or path of flow of the oil through the cleaner is a circuitous one. The flow of oil is from the oil pan 6, through the screens 66 and 68, to the underside of the cup 50, up the riser 56, then reversed by the member 80, then downward against the baffle 58 which reverses the flow to an upward direction and into the chamber 88 from which it is withdrawn by the pump.

In actual practice it has been found that a cleaner such as shown in the drawing need not be replaced for the life of the engine; in other words, the cleaner will continue to function substantially indefinitely. Actual tests have shown that the oil at the bottom 52 of the sediment trap will remain substantially motionless and that any particle that has once dropped over the edge 62 of the baffle will be permanently removed from the system. Our experiments have also shown that a single passage through the cleaner is ample to remove all of the particles which have a harmful effect on the bearings of the engine. Some particles, such as small, light pieces of carbon, may pass to the bearings, but these parts are not deleterious and in time even the carbon particles will be removed. The cleaner does not plug or become clogged for the reason that the space in the sediment chamber at the bottom of the cup 50 is large enough to take care of the removal of all impurities for the life of the engine. The cleaner therefore never plugs or clogs.

Our investigations have also shown that the cleaner is effective with any type of oil, but works better with a thin oil or a hot oil, so that the cleaner is more effective after the oil in the crankcase has been heated.

An additional advantage of the cleaner is that it is permanently built in as a part of the lubricating system and installed in the crankcase where it is out of the way and never needs to be replaced. It is also out of the way in so far as possible damage is concerned.

In our experiments we found that there is a definite relationship between the efficiency of the filter and the distance below the bottom of the neck 86 at which the baffle 58 must be placed and this position must be found by experiment and trial. For a normal cleaner, such as is installed in the lubricating system of an internal combustion engine as used on an automotive vehicle, it has been found that a riser having a diameter of substantially 1" should project up into the neck 86 of flow reversing member 80 a distance of about 3/8". In other words, the neck 86 should extend below the top of the riser a distance of about 3/8" and the distance from the tip of the cone 82 to the plane of the top of the riser should be substantially 1/16". With dimensions as given, the baffle 58 should be placed substantially 3/8" below the bottom of the neck 86 or about 3/4" below the top of the riser 56. After the oil leaves the mouth of the neck 86, it is important that the flow area be greatly increased. By referring to Figure 2, it will be noted that as the oil is directed against the baffle 58, the area of flow is many times greater than the cross sectional area between the neck 86 and the top of the riser 56. This will cause a very material slowing up in the velocity of the oil and enable the particles to be thrown out by the baffle and find their way over the edge 62 to work their way by gravity into the bottom 52 of the sediment trap.

The best modern filtering element decreases in efficiency in proportion to the age of the filter, and this efficiency is finally zero when the filter is plugged. With the present oil cleaner, the efficiency at the start is between 80% and 90%, and does not decrease throughout the life of the cleaner. The actual cleaning efficiency of the novel cleaner varies slightly with the speed of the engine and the viscosity of the oil. For instance, at an oil flow of 0.5 gallon a minute, at a temperature of 250° F., the efficiency is about 88% and as the oil flow increases with the speed of the engine there will be a decrease in efficiency to about 78% for an oil flow of 2.5 gallons per minute. It is therefore to be seen that the minimum efficiency of the present type oil cleaner is a number of times better than the maximum efficiency of a filter element through which but a fraction of oil passes.

In connection with the efficiency of the cleaner and in order to make the data given in the foregoing description accurate, three items must be given consideration:

1. The velocity of the oil through the cleaner.
2. The oil temperature and the grade of the oil, which is equivalent to specifying the viscosity.
3. The size of the particles removed.

The principal advantages of the cleaner are:

1. All oil passes through cleaner before reaching any moving part.
2. Cleaner contains no filtering material—only space for cleaning action and collected material.
3. Because the cleaner contains no filtering material, the possibility of element break-down and consequent migration to moving parts is impossible.
4. Capacity for collected material is sufficient for normal running life of engine; therefore, it requires no periodic attention, replacement or service adjustment.
5. The cleaner removes only those particles injurious to bearing surfaces.
6. The efficiency of the cleaner is not decreased by the collection of undesirable material.
7. Under conditions of high temperature operation, the cleaner efficiency is maximum; it therefore operates best where the need for oil cleaning is greatest; in the high temperature sections of the country.
8. The cleaner's efficiency under operating conditions is sufficient to very materially prolong the useful life of all moving parts in an engine, particularly those to which oil is fed under pressure.

We claim:

1. In an oil cleaner, a flow directing member in the cleaner, means to draw the oil to be cleaned through the flow directing member, a flow reversing element having a rounded reversing surface, said element being positioned immediately above but spaced from the end of the flow directing member and in the path of flow of the oil to cause a reversal of direction of flow by impact of the oil thereagainst, a flat baffle beyond the flow reversing element and being positioned around the flow directing member and having its outer edge spaced from the inside of the cleaner, said baffle causing the precipitation of the impurities in the oil and causing the oil again to reverse the direction of its flow, a sediment trap below said baffle to receive and retain the impurities precipitated at the baffle, the space in the cleaner through which the oil flows being greatly increased after the oil passes the baffle, and outlet means beyond the baffle to enable the oil to pass to the first named means.

2. In an oil cleaner, a flow directing member, a flow reversing element having a curved reversing surface spaced in fixed position above the flow directing member and in the path of flow therefrom to cause flow in a reverse direction, a baffle around said flow directing member so spaced from said flow reversing element as to cause immediate radial flow outward from said reversing element at a reduced velocity along said baffle to its periphery; a container surrounding and extending above and below said baffle and spaced therefrom, an outlet from said container above said baffle, and means for causing continuous flow of oil through said container.

3. In a cleaner for liquids, a cylindrical container, an inlet conduit in said container, a member for directing downward annular flow coaxial with said inlet conduit, and so spaced therefrom as to form a passage of undiminishing cross section between said member and said conduit, an annular baffle coaxial with said conduit and spaced below said member at such distance as will afford a radial path of flow of undiminished cross section between said member and said baffle, the wall of said container being spaced from and extending below said baffle, an outlet for said container above said baffle, and means for producing continuous flow of liquid through said container.

4. In a cleaner for liquids, a container, an inlet conduit for producing an upward flow of liquid in said container, a flow reversing member in fixed position coaxial with said inlet conduit and so spaced therefrom as to afford a passage of undiminishing cross section between said member and said conduit, a baffle extending outward from said conduit and spaced below said member at such distance as will afford a radial path of flow of undiminished cross section between said member and said baffle, the wall of said container being spaced from and extending below said baffle, an outlet for said container above said baffle, and means for producing continuous flow of liquid through said container.

5. In a cleaner for liquids, a container, an inlet conduit in said container, a member for directing downward annular flow coaxial with said conduit, a baffle, said baffle and said container being so spaced as to produce unidirectional flow of continually decreasing velocity towards the edge of said baffle, the wall of said container being spaced from and extending below said baffle, a second conduit leading from said container above said baffle, and means for producing a flow of liquid through said cleaner.

6. In a cleaner for liquids, a container, a conduit in said container for producing a reversal of liquid flow from an upward to a downward direction, an annular baffle coaxial with said conduit, said baffle being so positioned in said container as to cause unidirectional radial flow of continually decreasing velocity along the upper surface of said baffle to its periphery, the wall of said container being spaced from and extending below said baffle, a second conduit leading from said container above said baffle, and means for producing a flow of liquid through said cleaner.

7. In a cleaner for liquids, a container, a conduit in said container for directing upward flow, a flow reversing member so spaced from said conduit as to afford a passage of undiminishing cross section between said member and said conduit, a baffle normal to the flow of said reversing member so spaced therefrom as to afford radial flow of continually decreasing velocity towards the edge of said baffle, said edges being spaced from the wall of said container at a distance above the bottom thereof, and means for producing a flow of liquid through said cleaner.

8. A device for separating solids from a liquid comprising a casing having a cylindrical wall, an inlet opening and an outlet opening, an inlet pipe extending from said inlet opening and standing vertically in said casing, a bonnet fixed in said casing above the upper open end of said inlet pipe for reversing the flow of liquid flowing therefrom, and a dispensing flange fixed around said inlet pipe and extending outward nearly to, but clear from said cylindrical wall.

WILLIAM H. MANNING.
CLARENCE F. SMART.